United States Patent [19]
Kimura

[11] Patent Number: 4,498,110
[45] Date of Patent: Feb. 5, 1985

[54] OPTICAL DISC REPRODUCING APPARATUS

[75] Inventor: Kenji Kimura, Tachikawa, Japan

[73] Assignee: Olympus Optical Co., Ltd., Japan

[21] Appl. No.: 369,087

[22] Filed: Apr. 16, 1982

[30] Foreign Application Priority Data

Apr. 23, 1981 [JP] Japan .................................. 56-60628

[51] Int. Cl.³ .................... H04N 5/85; G11B 21/10
[52] U.S. Cl. .................................. 358/342; 360/10.1;
369/44; 369/111; 250/202
[58] Field of Search ............... 360/10.1; 358/342, 312;
369/44, 111; 250/202

[56]       References Cited
U.S. PATENT DOCUMENTS 3,854,015  12/1974  Janssen .................................. 358/342
3,911,211  10/1975  Rennick ................................. 358/342

Primary Examiner—Alan Faber
Attorney, Agent, or Firm—Parkhurst & Oliff

[57]            ABSTRACT

In an optical video disc player, a still picture mode reproduction is effected by returning a light spot on an optical video disc by one track pitch in its radial direction after each revolution of the disc. The displacement of the light spot is carried out by supplying a returning pulse to a moving coil coupled with an objective lens to move the objective lens in a disc radial direction. In order to cause the light spot to trace a track precisely, a tracking error due to an eccentricity of the disc is detected and the objective lens is moved in the disc radial direction in accordance with the detected tracking error. An amplitude of the returning pulse is modulated in accordance with a velocity component of the displacement of the objective lens under the tracking condition, so that the light spot is returned accurately by one track pitch.

10 Claims, 15 Drawing Figures

FIG.2
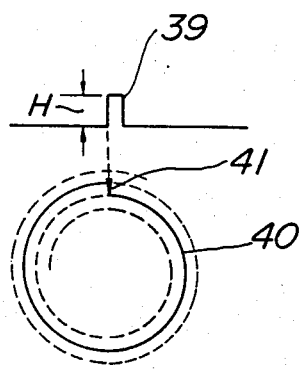
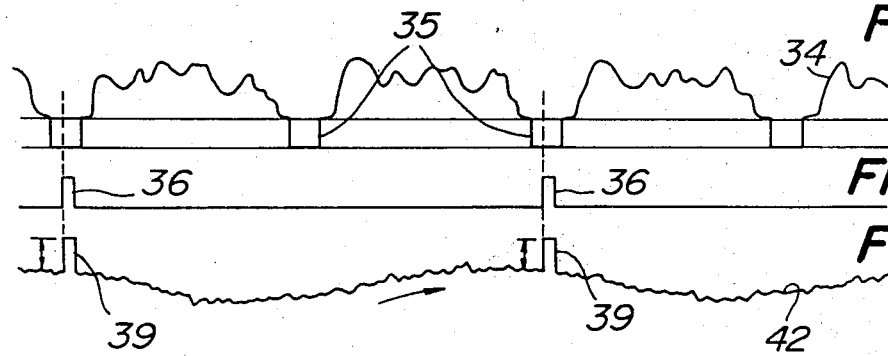
FIG.3A
FIG.3B
FIG.3C

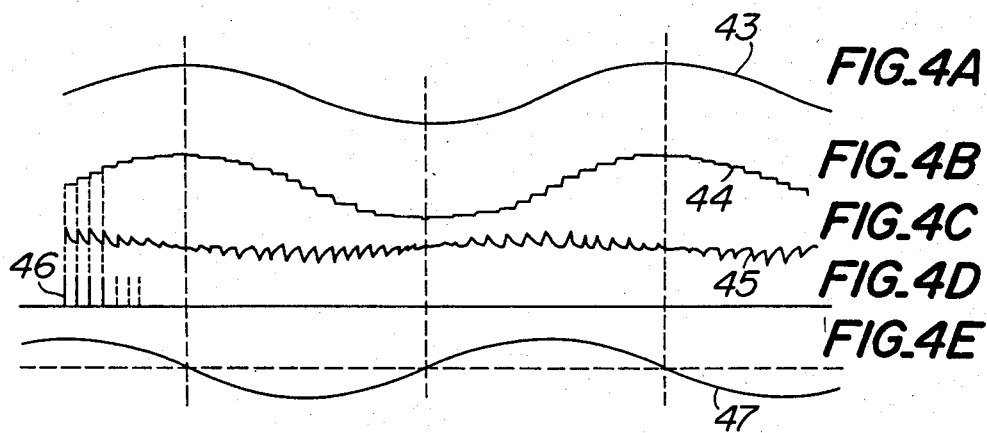
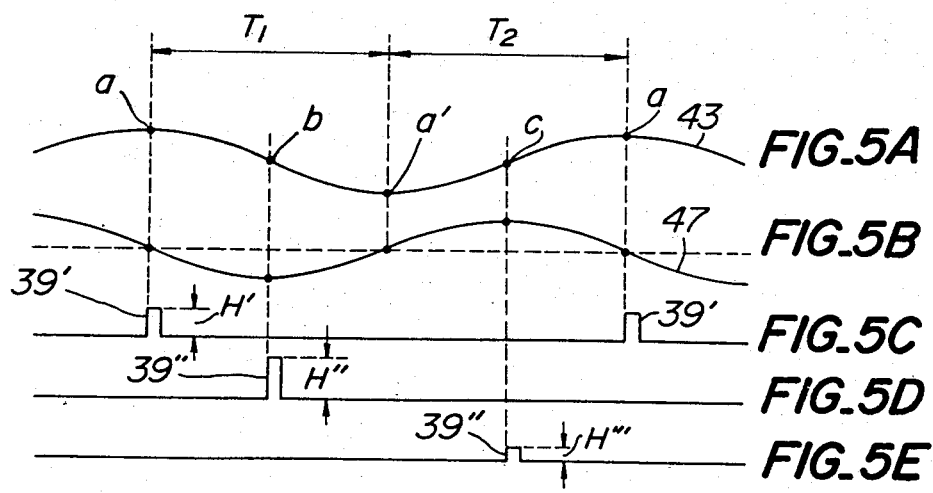

OPTICAL DISC REPRODUCING APPARATUS

BACKGROUND OF THE INVENTION

The present invention relates to an apparatus for reproducing an information signal recorded on an optical disc along spiral or concentric tracks comprising a light source for producing a light beam, an optical system for focusing the light beam onto the optical disc as a light spot, a light detector for receiving the light beam modulated in accordance with the information signal recorded on the disc to produce a reproduced signal, means for rotating the disc at a given revolving speed, and means for returning the light spot on the disc by one track pitch after every revolution of the disc so as to effect a special mode reproduction such as slow motion and still picture mode reproduction.

In a video disc, a video signal is so recorded that successive frame signals are recorded in successive tracks. In order to effect a still picture mode reproduction, the beam spot must be quickly moved backward by one track pitch in a stepwise manner in synchronism with a frame synchronizing signal derived from a reproduced video signal so as to cause the beam spot to trace the same track repeatedly. For effecting the still picture reproduction accurately, the beam spot should be returned precisely by one track pitch. This may be effected by rotating a movable mirror by a small angle or by shifting an objective lens in a tracking direction substantially perpendicular to an optical aixs of the lens as well as to a track direction. However, in practice, it is very difficult to return the beam spot accurately by one track pitch by means of an electro-mechanical mechanism for driving the mirror or lens. That is to say although a given control amount required for moving the beam spot by one track pitch has been previously set, an actual amount of displacement of the beam spot might be fluctuated due to a tracking control for moving the beam spot on the disc in its radial direction so as to cause the beam spot to trace the track accurately. In general, the disc has an eccentricity with respect to a spindle for rotating the disc and thus, a tracking error is produced in synchronism with the rotation of the disc. Therefore, in order to compensate the tracking error, the beam spot is moved at a rhythm of the revolving period of the disc. Further, when the beam spot is incident upon a portion of the disc at which the frame synchronizing signal is recorded, the beam spot may be moved either outwardly or inwardly in the disc radial direction in accordance with a tracking error which has been just detected at this moment. That is to say, the periodic phase of the eccentricity and the periodic phase of the frame synchronizing signal may be mutually varied arbitrarily depending upon a position or situation of the disc placed on a turn table. Therefore, even if a precisely determined control signal is supplied to a driving mechanism for moving the beam spot by one track pitch, the beam spot is not shifted accurately by one track pitch. It is assumed that the still picture reproduction mode is achieved by moving the beam spot inwardly in the disc radial direction. When the beam spot is moved also inwardly so as to correct the tracking error at the time of displacement of the beam spot, the beam spot is moved inwardly by more than one track pitch. Contrary to this, when the beam spot is moved outwardly under the control of the tracking servo, the beam spot could not reach a given track. It is apparent that the tracking error may occur entirely independently of the postion of the frame synchronizing signal on the disc and thus, even if the amount of the control signal for returning the beam spot is precisely determined, it is impossible to move the beam spot accurately by one track pitch.

SUMMARY OF THE INVENTION

The present invention has for its object to provide an apparatus for reproducing an information signal recorded on an optical disc along spiral or concentric tracks, in which a beam spot can be returned accurately by one track pitch in a stable manner without being affected by vibration of the beam spot due to compensation for tracking error.

It is another object of the invention to provide an optical disc reproducing apparatus in which a control amount for a beam spot displacing means can be automatically adjusted while taking into account a tracking error which has been just detected at such an instance.

According to the invention, in an apparatus for reproducing an information signal recorded on an optical disc along spiral or concentric tracks comprising means for emitting a light beam, means for focusing the light beam onto the optical disc as a light spot, means for rotating the optical disc at a given speed, means for receiving the light beam modulated in accordance with the information signal to produce a reproduced signal, means for producing a returning signal, means for moving the light spot on the optical disc in its radial direction by one track pitch in response to said returning signal so as to trace the same and single track repeatedly to effect a special mode reproduction such as still picture reproduction and slow motion picture reproduction, means for detecting a tracking error to produce a tracking error signal and means for moving the light spot in the disc radial direction in accordance with the tracking error signal to effect a tracking control the improvement comprises means for detecting a moving direction and a moving speed of the light spot in the disc radial direction under the tracking control; and means for adjusting a magnitude of said returning signal in accordance with the detected moving direction and moving speed of the light spot so as to return the light spot by one track pitch.

BRIEF DESCRIPTION OF THE DRAWINGS

FIG. 2 is a diagram for explaining a light spot returning operation;

FIGS. 3A to 3C show waveforms of a reproduced video signal, a frame synchronizing pulse and a combination of a returning pulse and a tracking control signal;

FIGS. 4A to 4E illustrate waveforms for explaining how to derive a velocity component; and FIGS. 5A to 5E show waveforms for explaining a relationship between an amplitude of a returning pulse and a velocity component.

DESCRIPTION OF THE PREFERRED EMBODIMENTS

Figure 1:
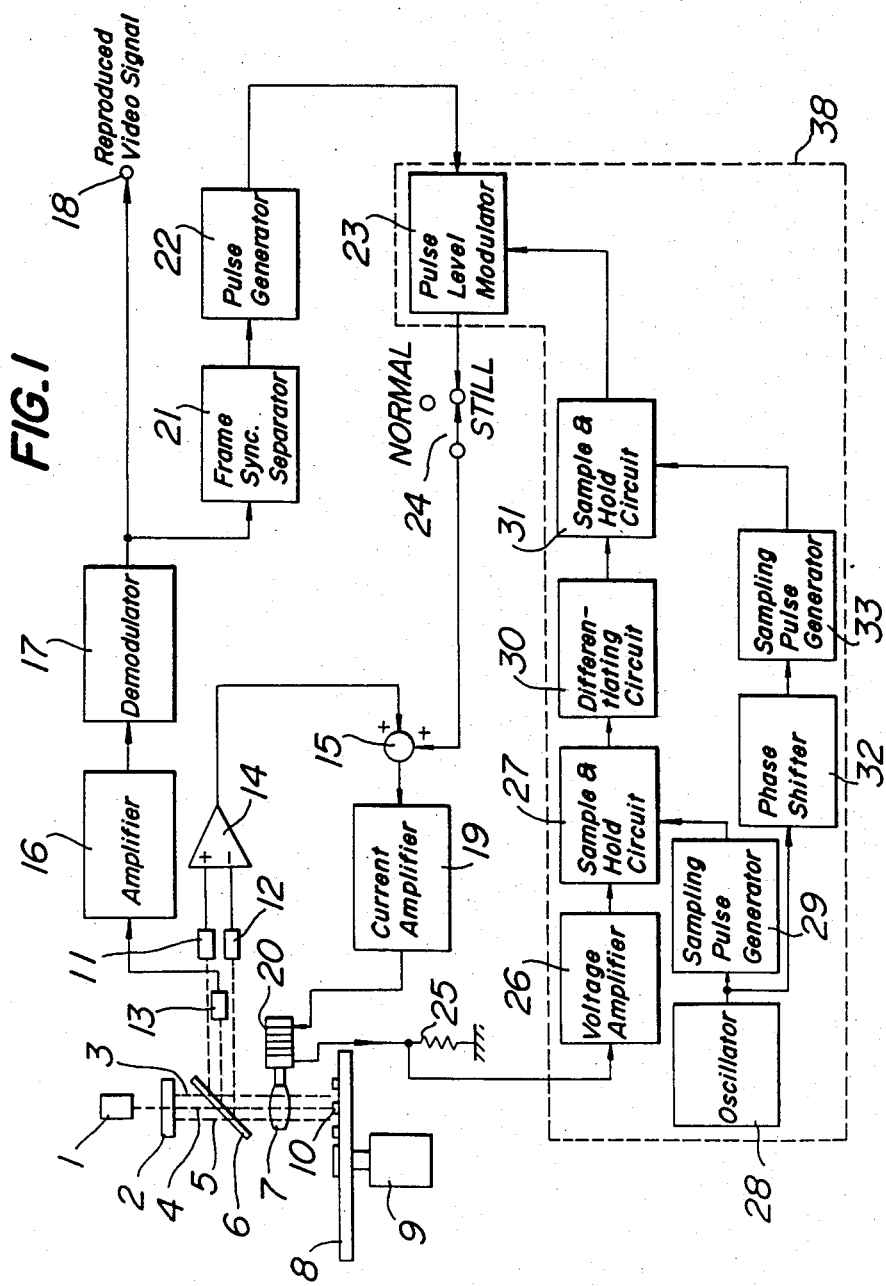
FIG. 1 is a block diagram showing an embodiment of the optical disc reproducing apparatus according to the invention.

FIG. 1 is a block diagram showing an embodiment of the optical disc reproducing apparatus according to the invention. A laser light beam emitted from a laser light source 1 is made incident upon a grating 2 and is divided into three beams 3, 4 and 5. These beams are transmitted through a half mirror 6 and are focused by an objective lens 7 onto an optical disc 8 as three light spots. The disc 8 is rotated by a motor 9 at a given constant speed such as 1,800 rpm. The three beam spots are so projected upon the disc 8 with respect to a spiral or concentric track 10 that a central spot traces a center of the track and both side beam spots scan both side edges of the same track. The light beams reflected by the disc 8 are collected by the objective lens 7 and the central beam is made incident upon a light detector 13 and the side beams are made incident upon light detectors 11 and 12. Output signals of the light detectors 11 and 12 are supplied to a differential amplifier 14 to produce a tracking error signal. An output signal from the light detector 13 is supplied through an amplifier 16 to a demodulator 17. An output signal from the demodulator 17 is supplied to an output terminal 18 as a reproduced video signal. An output signal from the differential amplifier 14 is supplied via a mixer 15 to a current amplifier 19 and an output signal from the amplifier 19 is supplied to a moving coil 20 as a tracking control signal. The moving coil 20 is coupled with the objective lens 7 and the tracking control is effected by moving the moving coil 20 and the objective lens 7 in a tracking direction perpendicular to an optical axis of the objective lens 7 as well as to a track direction. The tracking control mentioned above is generally called a three beam method and the main beam 5 can be always positioned on the center of the track.

According to the invention, in order to effect a still picture reproduction, there is provided a control circuit. The reproduced video signal from the demodulator 17 is supplied to a frame synchronizing signal separator 21. A frame synchronizing signal (pulse) separated from the video signal by the separator 21 is supplied to a pulse generator 22 as a triggering pulse. An output pulse from the pulse generator 22 is supplied to a pulse level modulator 23 and is modified or adjusted into a pulse having a given level. The pulse having the adjusted level is supplied through a mode switch 24 to the mixer 15 and is mixed with the tracking control signal of the tracking control mechanism. This pulse is used to return the objective lens 7 in the tracking direction by such an amount that the beam spot is shifted backward by one track pitch. The returning pulse is synchronized with the frame synchronizing signal and thus, the returning operation is effected during a vertical blanking period. Therefore, any transient due to the returning operation does not appear in a reproduced image. In the present embodiment, the returning operation has been finished within about 200μ seconds.

FIG. 2 is a diagram showing the returning operation by means of the returning pulse 39. In FIG. 2, a reference numeral 40 denotes a track formed in the disc 8 spirally. The disc is scanned by the beam spot from the inside to the outside. The beam spot is returned inwardly as shown by an arrow 41 by means of the returning pulse 39 by the track pitch and thus, the same and single turn of the track 40 is repeatedly traced by the beam spot. In this manner, the still picture mode reproduction can be effected. If each of successive track turns is traced repeatedly several times, the slow motion picture mode reproduction may be carried out. The amount of return is determined by an amount, i.e. amplitude H of the returning pulse 39. According to the present invention the amplitude H of the returning pulse 39 is automatically adjusted so that the amount of return of the beam spot is made always equal to the track pitch.

FIG. 3A shows the reproduced video signal 34 including the vertical synchronizing signal 35. FIG. 3B shows the frame synchronizing signal 36 separated by the frame synchronizing signal separator 21. Further, FIG. 3C illustrates the returning pulse 39 produced from the pulse level modulator 23 and superimposed on the tracking error signal 42. The returning pulse 39 appears in the vertical blanking period.

According to the invention, as indicated by double headed arrows in FIG. 3C the level of the returning pulse 39 is automatically adjusted in accordance with the tracking error signal 42. For this purpose, a control circuit 38 indicated by a dotted block is provided. The moving coil 20 is connected to ground via a resistor 25 to produce across the resistor a voltage proportional to the current passing through the moving coil 20. Therefore, an amplitude of the voltage generated across the resistor 25 is proportional to an amount of the displacement of the objective lens 7. Since the displacement of the objective lens 7 represents mainly the eccentricity of the disc 8, the eccentricity component is detected. The eccentricity component thus detected is amplified by a voltage amplifier 26 and the amplified voltage is applied to a first sample and hold circuit 27. The control circuit 38 further comprises an oscillator 28 for generating a signal having a frequency higher than that of the eccentricity component. When the disc 8 is rotated at 1,800 rpm, the eccentricity component has the frequency of about 30 Hz and then the frequency of the oscillator 28 may be 300 Hz. The signal generated from the oscillator 28 triggers a sampling pulse generator 29 to produce a sampling pulse which is then supplied to the first sample and hold circuit 27. In this manner, the eccentricity component is sampled and held by the sample and hold circuit 27 at a frequency which is sufficiently higher than the frequency of the eccentricity component. The sampled and held signal is differentiated by a differentiating circuit 30 to produce a differentiated signal. Peak value of the differentiated signal represents a velocity component of the eccentricity component. In order to detect the peak value, the differentiated signal is supplied to a second sample and hold circuit 31. The output signal from the oscillator 28 is supplied through a phase shifter 32 to a second sampling pulse generator 33 to produced a sampling pulse which is supplied to the second sample and hold circuit 31. The phase shifter 32 is provided for compensating a possible phase delay introduced by the first sample and hold circuit 27 and differentiating circuit 30.

FIG. 4A shows a waveform of the output voltage 43 from the voltage amplifier 26 representing the eccentricity component, FIG. 4B a waveform of the output voltage 44 from the first sample and hold circuit 27, FIG. 4C a waveform of the differentiated voltage 45 from the differentiating circuit 30, FIG. 4D a waveform of the sampling pulse 46 supplied from the second sampling pulse generator 33 and FIG. 4E illustrates a waveform of the output voltage 47 from the second sample and hold circuit 31 representing the velocity component. As can be seen from FIGS. 4A to 4E, the output voltage 47 of the second sample and hold circuit 31 contains information about the velocity component of the displacement of the objective lens 7 in the disc radial direction. Therefore, according to the invention, the voltage 47 is applied to a pulse level modulator 23 to control or adjust the amplitude H of the returning pulse 39 shown in FIG. 3C in a manner to be explained hereinbelow with reference to FIGS. 5A to 5E.

FIG. 5A shows the displacement of the objective lens 7, i.e. the output voltage 43 from the amplifier 16, FIG. 5B illustrates the velocity component of the moving objective lens 7, i.e. the output voltage 47 from the second sample and hold circuit 31, and FIGS. 5C to 5E depict the returning pulses 39', 39" and 39'" supplied from the pulse level modulator 23 at various timings. It should be noted that the timings at which the returning pulses occur are not fixed with respect to the displacement of the objective lens. During a period $T_1$ the objective lens is moved outwardly in the disc radial direction, and during a period $T_2$ the objective lens is moved inwardly in the disc radial direction. At points a and a' the objective lens is made stationary and thus, the velocity component 47 becomes zero. Then, the returning pulse 39' has a standard amplitude H'. At a point b in which the objective lens is moved outwardly at the maximum speed, the returning pulse 39" has an amplitude H" higher than the standard amplitude H'. Contrary to this, at a point c at which the objective lens is moved inwardly at the maximum velocity, the returning pulse 39'" has an amplitude H'" which is substantially smaller than the standard level H'. In this manner, according to the invention, the amplitude of the returning pulse is automatically adjusted in accordance with the velocity component of the displacment of the objective lens and thus, it is possible to move the beam spot on the optical disc in the radial direction accurately by one track pitch to effect the still picture reproduction in an accurate and stable manner.

The present invention is not restricted to the embodiment mentioned above, but many modifications and alternations may be conceived by those skilled in the art within the scope of the invention. For instance, in the above embodiment the same and single track is repeatedly traced to effect the still picture mode reproduction, but it is also possible to reproduce the video signal in a slow motion picture mode, a reverse motion, a frame-by-frame mode. Further, in the above embodiment, the beam spot is returned by means of the moving coil connected to the objective lens, but it is apparent that the objective lens may be moved in the tracking direction by means of any other mechanism or the beam spot may be displaced by means of a swingable mirror arranged between the light source and the objective lens. Moreover, in the above explained embodiment the tracking error signal is derived with the aid of the three beam method, but any other method may be equally used. Further, the tracks may be concentric instead of spiral. In the above embodiment, the displacement of the objective lens is detected from the tracking error signal, but it may be derived by detecting directly the movement of the objective lens.

What is claimed is:

1. In an apparatus for reproducing an information signal recorded on an optical disc along spiral or concentric tracks, wherein said apparatus comprises means for emitting a light beam, means for focusing the light beam onto the optical disc as a light spot, means for rotating the optical disc at a given speed, means for receiving light from said disc modulated in accordance with the information signal recorded on said disc to produce a reproduced signal, means responsive to said spot position with respect to a track for detecting a tracking error and producing a tracking error signal, means responsive to said tracking error signal for moving the light spot in a radial direction of the disc to control said tracking error, and means for producing a return signal representing the amount of movement necessary to cause said light spot to trace the same track, said means for moving said light spot in a radial direction of said disc being responsive to said return signal to move said light spot so that it returns to trace said same track, the improvement in said apparatus comprising:

means for detecting the direction and speed of movement of said light spot on said disc in response to said tracking error signal; and means responsive to said detected direction and speed of said light spot movement for modifying said return signal to cause said light spot to trace the same track.

2. An apparatus according to claim 1, wherein said means for detecting the direction and speed of the light spot comprises, means for detecting an eccentricity component of a displacement of the light spot, and means for detecting a velocity component from the eccentricity component.

3. An apparatus according to claim 2, wherein said eccentricity component detecting means comprises means for detecting a signal proportional to the tracking error signal.

4. An apparatus according to claim 3, wherein said signal detecting means comprises a resistor through which the tracking error signal is passed.

5. In an apparatus for reproducing an information signal recorded on an optical disc along spiral or concentric tracks, wherein said apparatus comprises means for emitting a light beam, means for focusing the light beam onto the optical disc as a light spot, means for rotating the optical disc at a given speed, means for receiving light from said disc modulated in accordance with the information signal recorded on said disc to produce a reproduced signal, means responsive to said spot position with respect to a track for detecting a tracking error and producing a tracking error signal, means responsive to said tracking error signal for moving the light spot in a radial direction of the disc to control said tracking error, and means for producing a return signal representing the amount of movement necessary to cause said light spot to trace the same track, said means for moving said light spot in a radial direction of said disc being responsive to said return signal to move said light spot so that it returns to trace said same track, the improvement in said apparatus comprising:

means for detecting the direction and speed of movement of said light spot on said disc in response to said tracking error signal, said means for detecting comprising means for detecting an eccentricity component of a displacement of the light spot and means for detecting a velocity component from the eccentricity component, said means for detecting the velocity component including a first sample and hold circuit coupled to sample and hold said eccentricity component and provide an output thereof, a differentiating circuit coupled to differentiate the output of said first sample and hold circuit to provide a differentiated output, a second sample and hold circuit coupled to sample and hold said differentiated output as said velocity component, and a sampling pulse generating circuit coupled to cause sampling pulses to be supplied to said first and second sample and hold circuits to produce sampling and holding of said eccentricity component and said differentiated output; and means responsive to said detected direction and speed of said light spot movement for modifying said return signal to cause said light spot to trace the same track.

6. An apparatus according to claim 5, wherein said sampling pulse generating circuit comprises, an oscillator for generating a signal having a frequency which is sufficiently higher than a frequency of the eccentricity component;

a first pulse generator triggered by the output signal from the oscillator to produce sampling pulses to be supplied to the first sample and hold circuit;

a phase shifter for delaying the output signal from the oscillator by a given phase to produce a delayed signal; and a second sampling pulse generator triggered by the delayed signal from the phase shifter to produce sampling pulses to be supplied to the second sample and hold circuit.

7. In an apparatus for reproducing an information signal recorded on an optical disc along spiral or concentric tracks, wherein said apparatus comprises means for emitting a light beam, means for focusing the light beam onto the optical disc as a light spot, means for rotating the optical disc at a given speed, means for receiving light from said disc modulated in accordance with the information signal recorded on said disc to produce a reproduced signal, means responsive to said spot position with respect to a track for detecting a tracking error and producing a tracking error signal, means responsive to said tracking error signal for moving the light spot in a radial direction of the disc to control said tracking error, and means for producing a return signal representing the amount of movement necessary to cause said light spot to trace the same track, said means for moving said light spot in a radial direction of said disc being responsive to said return signal to move said light spot so that it returns to trace said same track, the improvement in said apparatus comprising:

means for detecting the direction and speed of movement of said light spot on said disc in response to said tracking error signal; and means responsive to said detected direction and speed of said light spot movement for modifying said return signal and cause said light spot to trace the same track, said means for modifying said return signal including a pulse level modulator coupled to modulate the level of said return signal in accordance with said detected direction and speed of said light spot.

8. An apparatus according to any one of the preceding claims 2, 3, 4, 6, 1, 5 or 7, wherein said returning pulse generating means comprises a circuit for separating from the reproduced signal a signal synchronized with the rotation of the optical disc and a pulse generator for producing the returning signal having a constant amplitude.

9. An apparatus according to claim 8, wherein said optical disc comprises a video signal as said information signal and said separating circuit separates a frame synchronizing pulse in a reproduced video signal.

10. In an apparatus for reproducing an information signal recorded in tracks on an optical medium, wherein said apparatus comprises means for emitting a light beam, means for focusing the light beam onto the optical medium as a light spot, means for moving the optical medium with respect to said spot, means for receiving light from said optical medium modulated in accordance with the information signal to produce a reproduced signal, means responsive to said spot position with respect to a track for detecting a tracking error and producing a tracking error signal, means responsive to said tracking error signal for moving the light spot relative to a track to control said tracking error, and means for producing a return signal representing the amount of movement necessary to cause said light spot to trace the same track, said means for moving said light spot being responsive to said return signal to move said light spot so that it returns to trace said same track, the improvement in said apparatus comprising:

means for detecting the direction and speed of movement of said light spot on said disc in response to said tracking error signal; and means responsive to said detected direction and speed of said light spot movement for modifying said return signal to cause said light spot to trace the same track.

* * * * *